United States Patent
Liao

(10) Patent No.: US 9,231,665 B2
(45) Date of Patent: Jan. 5, 2016

(54) PORTABLE ELECTRONIC DEVICE CAPABLE OF EXPANDING TRANSMISSION DISTANCE FOR NEAR FIELD COMMUNICATION FUNCTIONS

(71) Applicant: HON HAI PRECISION INDUSTRY CO., LTD., New Taipei (TW)

(72) Inventor: Kuang-Yao Liao, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 26 days.

(21) Appl. No.: 14/092,949

(22) Filed: Nov. 28, 2013

(65) Prior Publication Data
US 2014/0187157 A1 Jul. 3, 2014

(30) Foreign Application Priority Data
Dec. 28, 2012 (TW) .............................. 101150868 A

(51) Int. Cl.
*H04B 5/00* (2006.01)
*H02J 7/02* (2006.01)
*H04B 1/3827* (2015.01)

(52) U.S. Cl.
CPC .............. *H04B 5/0037* (2013.01); *H02J 7/025* (2013.01); *H04B 1/385* (2013.01); *H04B 5/0081* (2013.01); *H04B 2001/3855* (2013.01); *H04B 2001/3861* (2013.01)

(58) Field of Classification Search
CPC ..................................................... H04B 5/0037
USPC ......................................... 455/39, 41.1, 41.2
See application file for complete search history.

(56) References Cited

U.S. PATENT DOCUMENTS

| 7,385,498 | B2 * | 6/2008 | Dobosz | 340/539.12 |
| 2011/0136550 | A1 * | 6/2011 | Maugars | 455/573 |
| 2011/0288615 | A1 * | 11/2011 | Armstrong et al. | 607/59 |

* cited by examiner

*Primary Examiner* — Tuan H Nguyen
(74) *Attorney, Agent, or Firm* — Novak Druce Connolly Bove + Quigg LLP

(57) ABSTRACT

A portable electronic device capable of expanding transmission distance of NFC is provided. The portable electronic device includes a watch-strap portion, a power module, an NFC module, and a relay coil group arranged in the watch-strap portion. The power module includes a wireless charging coil, and the NFC module includes an NFC antenna. The relay coil group is configured to relay external electromagnetic power from an external power source to the power module by the coil group being magnetically coupled with the wireless charging coil. The relay coil group is also configured to relay NFC information between the NFC module and an external NFC read-write device or an external NFC storing device by the coil group being magnetically coupled with the NFC antenna. Therefore, the distances for both charging and NFC functions are expanded.

4 Claims, 3 Drawing Sheets

PORTABLE ELECTRONIC DEVICE CAPABLE OF EXPANDING TRANSMISSION DISTANCE FOR NEAR FIELD COMMUNICATION FUNCTIONS

BACKGROUND

1. Technical Field

The present disclosure relates to near field communication (NFC), particularly to a portable electronic device capable of expanding transmission distance for NFC functions.

2. Description of Related Art

With the popularization of NFC technology, portable electronic devices having a NFC module usually integrate with several different NFC applications, such as bus card, credit card, access card, bank card, and membership card. However, the transmission distance for performing NFC functions is short, which is inconvenient to use. In addition, these auxiliary NFC applications increase power consumption. Therefore, simplifying the charging process of the rechargeable battery and expanding the transmission distance for NFC functions, are important aspects in the design of portable electronic devices.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
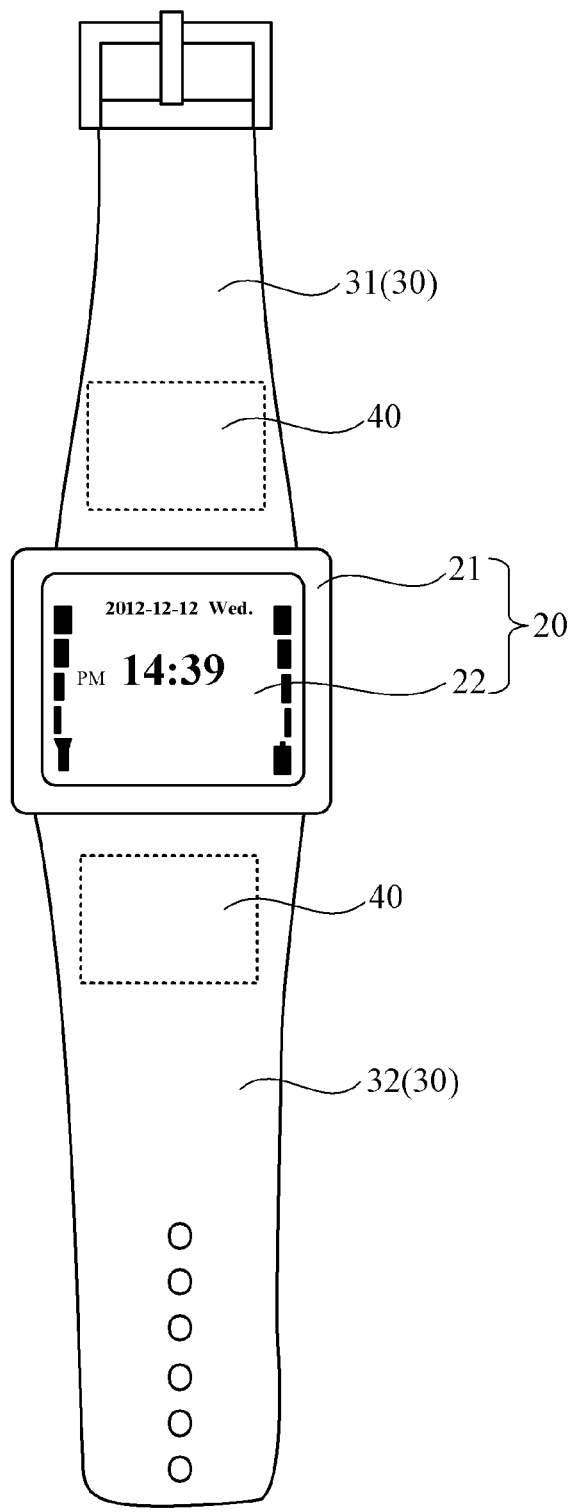
FIG. 1 is a schematic diagram of an embodiment of a portable electronic device.

FIG. 1 illustrates a portable electronic device 100. The portable electronic device 100 includes a body 20 and a watch-strap portion 30. The body 20 includes a shell 21 and a display unit 22 arranged on the shell 21.

The watch-strap portion 30 includes a first watch strap 31 and a second watch strap 32 respectively connected to opposite end portions of the body 20. The first watch strap 31 and the second watch strap 32 are used to attach the portable electronic device 100 on a wrist of a user.

In the embodiment, the portable electronic device 100 further includes one or more relay coil groups 40 arranged in the watch-strap portion 30.

Figure 2:
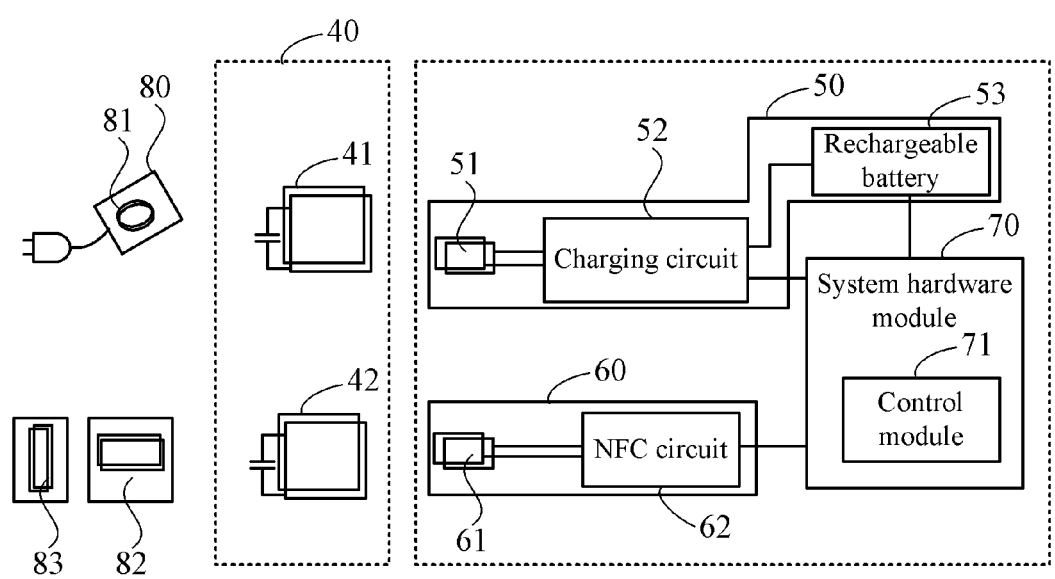
FIG. 2 is an embodiment of a block diagram of the portable electronic device of FIG. 1.

FIG. 2 shows that the portable electronic device 100 further includes a power module 50, an NFC module 60 and a system hardware module 70. The power module 50 and the NFC module 60 can be arranged in interior of the body 20 or in the watch-strap portion 30.

The power module 50 includes a wireless charging coil 51, a charging circuit 52 and a rechargeable battery 53 connected in that order. The NFC module 60 includes an NFC antenna 61 and an NFC circuit 62 connected to the NFC antenna 61. The relay coil group 40 is configured to relay external electromagnetic power from an external power source 80 to the power module 50 by the relay coil group 40 being magnetically coupled with the wireless charging coil 51. The relay coil group 40 is also configured to relay NFC information between the NFC module 60 and an external NFC read-write device 82 or an external NFC storing device 83 by the coil group 40 being magnetically coupled with the NFC antenna 61. Therefore, the charging distance between the external power source 80 and the power module 50, and the NFC distance between the external NFC device and the NFC module 50 are both expanded.

In a first embodiment, the relay coil group 40 includes a first magnetic resonant coil 41 and a second magnetic resonant coil 42. The first magnetic resonant coil 41 has approximately the same resonant frequency as the wireless charging coil 51 and an external power supply coil 81 of the external power source 80. When the first magnetic resonant coil 41 is magnetically coupled with the external power supply coil 81 by a magnetic field generated by the external power supply coil 81, the first magnetic resonant coil 41 generates another magnetic field coupling with the wireless charging coil 51 and transmits the external electromagnetic power from the external power supply coil 81 to the charging circuit 52 through the wireless charging coil 51 to charge the rechargeable battery 53. The rechargeable battery 53 is configured to supply power for the system hardware module 70.

The second magnetic resonant coil 42 has approximately the same resonant frequency as the NFC antenna 61. In the embodiment, the second magnetic resonant coil 42 is magnetically coupled with the external NFC read-write device 82 by a magnetic field generated by the external NFC read-write device 82, and generates another magnetic field coupling with the NFC antenna 61 and transmits an external NFC read-write signal from the external NFC read-write device 82 to the NFC circuit 62 through the NFC antenna 61. The NFC circuit 62 responds to the external NFC read-write signal and outputs required NFC data to the NFC antenna 61 to send back to the external NFC read-write device 82 through the second magnetic resonant coil 42.

The system hardware module 70 includes a control module 71 connected to the charge module 50 and the NFC module 60. In order to read or write NFC data stored in the external NFC storing device 83, such as an NFC card, the control module 71 controls the NFC circuit 62 to output an internal read-write signal, and controls the NFC antenna 61 to generate a magnetic field. The second magnetic resonant coil 42 is magnetically coupled with the NFC antenna 61 by the magnetic field generated by the NFC antenna 61, and generates another magnetic field coupling with the external NFC storing device 83 and transmits the internal NFC read-write signal from the NFC circuit 62 to the external NFC storing device 83.

Figure 3:
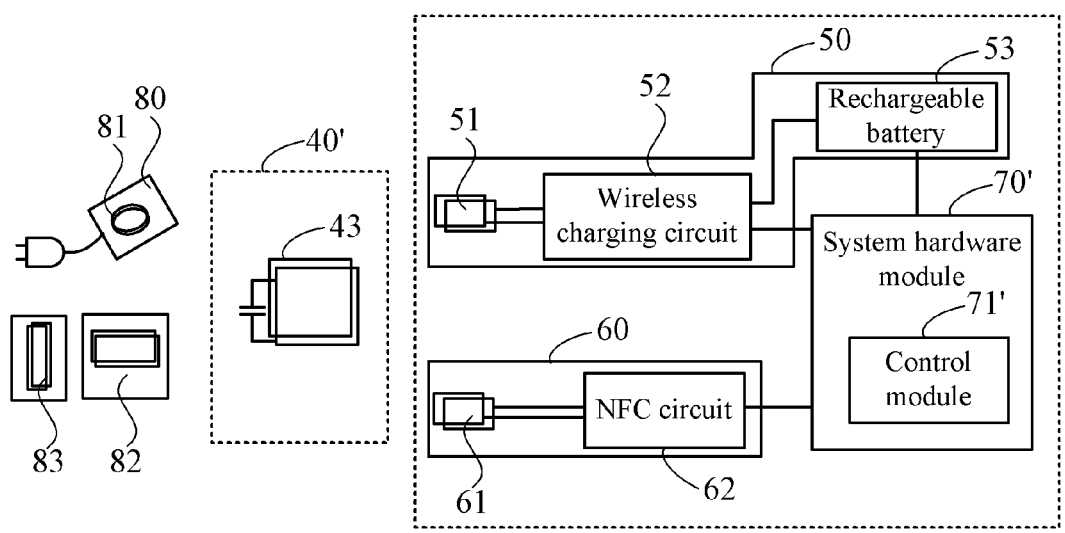
FIG. 3 is another embodiment of a block diagram of the portable electronic device of FIG. 1.

A second embodiment of the portable electronic device 100 shown in FIG. 3 is similar to the first embodiment except that the relay coil group 40' includes a third magnetic resonant coil 43. The third magnetic resonant coil 43 has approximately the same resonant frequency as the wireless charging coil 51 and the NFC antenna 61. The control module 71' is configured to enable the charge module 50 and disable the NFC module 60, so that the third magnetic resonant coil 43 is magnetically coupled with the wireless charging coil 51 to charge the portable electronic device 100. The control module 71' is also configured to enable the NFC module 60 and disable the charge module 50, so that the third magnetic resonant coil 43 is magnetically coupled with the NFC antenna 61 to enable the portable electronic device 100 to perform NFC functions. Therefore, the charge module 50 and the NFC module 60 can perform their respective functions by the wireless charging coil 51 and the NFC antenna 61 being magnetically coupled with the third magnetic resonant coil 43.

Moreover, it is to be understood that the disclosure may be embodied in other forms without departing from the spirit thereof. Thus, the present examples and embodiments are to be considered in all respects as illustrative and not restrictive, and the disclosure is not to be limited to the details given herein.

What is claimed is:

1. A portable electronic device comprising:
   a body;
   a watch-strap portion configured to attach the portable electronic device on a wrist of a user;
   a power module comprising a wireless charging coil, a wireless charging circuit, and a rechargeable battery connected in that order;
   an NFC module comprising an NFC antenna and an NFC circuit connected to the NFC antenna;
   a relay coil group arranged in the watch-strap portion and comprising a magnetic resonant coil having approximately the same resonant frequency as the wireless charging coil and the NFC antenna, the relay coil group configured to transfer external electromagnetic power from an external power source to the power module by the relay coil group being magnetically coupled between the external power source and the wireless charging coil; the relay coil group also configured to transfer NFC information between the NFC module and an external NFC device by the relay coil group being magnetically coupled between the external NFC device and the NFC antenna; and
   a control module connected to the power module and the NFC module, wherein the control module is configured to enable the power module and disable the NFC module, so that the magnetic resonant coil is magnetically coupled with the wireless charging coil to charge the portable electronic device; the control module is also configured to enable the NFC module and disable the power module, so that the magnetic resonant coil is magnetically coupled with the NFC antenna to enable the portable electronic device to perform NFC functions.

2. The portable electronic device as described in claim 1, wherein the magnetic resonant coil is configured to be magnetically coupled with an external power supply coil of the external power source by a magnetic field generated by the external power supply coil, and generates another magnetic field coupling with the wireless charging coil and transmits the external electromagnetic power from the external power supply coil to the charging circuit through the wireless charging coil to charge the rechargeable battery.

3. The portable electronic device as described in claim 1, wherein when the magnetic resonant coil is magnetically coupled with an external NFC read-write device by a magnetic field generated by the external NFC read-write device, the magnetic resonant coil generates another magnetic field coupling with the NFC antenna and transmits an external NFC read-write signal from the external NFC read-write device to the NFC circuit through the NFC antenna, and the NFC circuit responds to the external NFC read-write signal and outputs required NFC data to the NFC antenna to send back to the external NFC read-write device through the magnetic resonant coil.

4. The portable electronic device as described in claim 1, wherein to read or write data stored in an external NFC storing device, the control module controls the NFC circuit to output an internal read-write signal, and controls the NFC antenna to generate a magnetic field; the magnetic resonant coil is magnetically coupled with the NFC antenna by the magnetic field generated by the NFC antenna, and generates another magnetic field coupling with the external NFC storing device and transmits the internal NFC read-write signal from the NFC circuit to the external NFC storing device.

* * * * *